United States Patent [19]

Cascajosa

[11] Patent Number: 4,714,065
[45] Date of Patent: Dec. 22, 1987

[54] METHOD AND DEVICE FOR SUPPLYING FUEL AND AIR TO AN INTERNAL COMBUSTION ENGINE

[75] Inventor: Felix G. Cascajosa, Madrid, Spain

[73] Assignee: Latimer N.V., Curacao, Netherlands Antilles

[21] Appl. No.: 745,871

[22] Filed: Jun. 17, 1985

[30] Foreign Application Priority Data

Aug. 14, 1984 [EP] European Pat. Off. ............ 84109685

[51] Int. Cl.$^4$ ............................................ F02M 34/00
[52] U.S. Cl. .................................... 123/452; 123/497; 123/383
[58] Field of Search ................ 123/452, 453, 454, 455, 123/383, 497

[56] References Cited

U.S. PATENT DOCUMENTS

| | | | |
|---|---|---|---|
| 3,930,481 | 1/1976 | Eckert | 123/453 |
| 4,120,274 | 10/1978 | DeLancey | 123/452 |
| 4,350,131 | 9/1982 | Kiuchi | 123/453 |
| 4,485,788 | 12/1984 | Hofbauer | 123/452 |
| 4,523,568 | 6/1985 | Dorsch | 123/383 |

FOREIGN PATENT DOCUMENTS

| | | | |
|---|---|---|---|
| 2504960 | 12/1976 | Fed. Rep. of Germany | 123/383 |
| 3201756 | 11/1982 | Fed. Rep. of Germany | 123/383 |
| 2251710 | 6/1975 | France | 123/452 |

*Primary Examiner*—Carl Stuart Miller
*Attorney, Agent, or Firm*—James E. Nilles

[57] ABSTRACT

A method and a device for supplying fuel and air to an internal combustion engine 1, in the case of which fuel is supplied to at least one injection valve 2 and combustion air is supplied to at least one intake pipe 3 provided with a throttle 4. For the purpose of achieving a simple and reliable mode of operation and for the purpose of guaranteeing a reliable supply of fuel and air to the internal combustion engine 1 under all operating conditions, the intake pipe 3 has coercively supplied thereto a predetermined amount of air corresponding to the respective position of the throttle 4 and, simulatenously, the injection valve 2 has coercively supplied thereto an amount of fuel in a fixed predetermined ratio to the amount of air. For carrying out this method, a pump device 5 is used, which is provided with two pump impellers 6, 7, which are arranged such that they are coaxial and adapted to be rotated about an ideal axis of rotation and which are disposed in separate flow channels 9, 10, said pump impellers constituting contra-rotating parts of a motor, which does not have any output shaft and which is exclusively used to the purpose of driving siad pump impellers 6, 7, the first pump impeller 6 being part of a fuel pump 13 whose outlet 12 is connected to at least one injection nozzle 2, and the second pump impeller 7 being designed as an air compressor impeller arranged in the area of the intake pipe 3 (FIG. 1).

28 Claims, 7 Drawing Figures

METHOD AND DEVICE FOR SUPPLYING FUEL AND AIR TO AN INTERNAL COMBUSTION ENGINE

BACKGROUND OF THE INVENTION

The present invention refers to a method of supplying fuel and air to an internal combustion engine. In the case of which fuel is supplied to at least one injection valve and combustion air is supplied to at least one intake pipe provided with a throttle.

Methods of supplying fuel and air to an internal combustion engine, in the case of which the internal combustion engine takes in combustion air through an intake pipe having provided therein a throttle, are already known. The throttle is in this case coupled to an accelerator pedal so that the degree of opening of the throttle determines the size of the free flow cross-section of the intake pipe and, consequently, the amount of air taken in. It follows that an acceleration or a deceleration of the speed of the internal combustion engine is controlled via the position of the throttle. In the case of the methods known, the amount of combustion air determined by the position of the throttle is measured, said amount of combustion air being then inputted into a separate control circuit as an input value. This control circuit then determines, in response to this input value, the amount of fuel which has to be supplied to the engine by means of an injection nozzle for the purpose of providing satisfactory operating conditions for the internal combustion engine. It follows that these known methods operate in response to the amount of combustion air taken in by the engine and control, in accordance with said amount of combustion air, the amount of fuel required. In the case of known devices for carrying out these methods an air-quantity measuring device is provided upstream of the respective throttle, said air-quantity measuring device being used for the purpose of determining the amount of air taken in by the engine. This air-quantity measuring device provides either a mechanical or an electrical correcting variable which is supplied to a suitable control means. Independently of the control means and independently of the throttle, a fuel pump applies a suitable fuel pressure to the fuel line provided upstream of the injection valve. This fuel pressure always has a constant value irrespectively of the operating conditions of the internal combustion engine. The control means cooperates with the injection valve in a mechanical or in an electronical manner and determines the opening time of said injection valve in response to the amount of air taken in. It follows that these known methods are based on the idea of controlling, in response to an engine operating parameter (amount of air taken in) a second operating parameter (amount of fuel required). Hence, the known devices for carrying out these methods always provide an air-quantity measurement which influences via the control means the opening time of an injection valve with the aid of which fuel having a constant pressure is injected. The fuel pump itself and the pressure of the fuel in the fuel line do, consequently, not participate directly in this method. These known methods show several serious disadvantages. The air-quantity measuring devices required for carrying out these methods are very complicated and susceptible to failure and do not permit any faultless measurement of the combustion air taken in, since fluctuations in the air temperature and influences exerted by varying flow conditions cannot be excluded. Primarily in the case of noload operation and in the case of maximum-speed operation of the internal combustion engine, an exact measurement of the amount of air and an appropriate apportioning of the amount of fuel is hardly possible. Furthermore, the inertia of the air-quantity measuring devices used exerts an influence on the reaction time of the control means and produces thus a quite substantial engine operating period, e.g. during acceleration or during throttling down, during which an undesirable ratio exists between the amount of fuel injected and the amount of combustion air taken in by the engine. The devices used for carrying out the known methods of supplying fuel and air to an internal combustion engine are, on the whole, very complicated, and this has the effect that not only the production costs but also the amount of maintenance work required is substantially increased.

Methods which are additionally known are methods of supplying fuel and air to an internal combustion engine in the case of which the combustion air has applied thereto an appropriate pressure by means of a compressor or a blower. However, said blowers or compressors either operate such that they are completely independent of the speed of the internal combustion engine or they are directly connected to the crankshaft of the internal combustion engine so that they produce a specific air pressure in the intake pipe, said air pressure being not consistent with the amount of air taken in by the internal combustion engine. It follows that, in this case, too, it will be necessary to control the amount of air, which is to be supplied to the internal combustion engine, by means of a throttle coupled to an accelerator pedal. In the case of these methods the measurement and control processed required for determining and for injecting the necessary amount of fuel are very complicated and susceptible to failure. In particular, in the case of the devices on which these methods are based, the measure of supplying the fuel under pressure to a fuel line by means of a separate fuel pump cannot be dispensed with either. Hence, these devices are provided with two separate pumps, one for the fuel and one for the combustion air. The mode of operation of these two pumps cannot be coordinated so as to obtain a desired ratio between the combustion air and the fuel.

SUMMARY OF THE INVENTION

The present invention is based on the task of providing a method and a device for supplying fuel and air to an internal combustion engin, which guarantee, on the basis of a simple and reliable mode of operation, a reliable supply of fuel and air in a desired quantitative proportion under all operating conditions.

In accordance with the invention, this task is solved—as far as the method is concerned—by the features that the intake pipe has coercively supplied thereto a predetermined amount of air corresponding to the respective position of the throttle and that, simultaneously, the injection valve has coercively supplied thereto an amount of fuel in a fixed, predetermined ratio to the amount of air.

The method according to the invention shows substantial advantages in comparison with the prior art. Due to the simultaneous coercive supply of fuel and air in a predetermined ratio it is guaranteed that the internal combustion engine always operates under optimum operating conditions. In this way, it is achieved that, within the combustion chambers, a predeterminable combustion takes place, which results in an emission of noxious matter which is limited to an absolute minimum. The emission of hydrocarbons is much lower than the value permitted in accordance with the regulations in force. Due to the supply of an amount of air corresponding to the respective position of the throttle, it is achieved that the engine operates in response to the output desired. It follows that the supply of the amount of air and of the amount of fuel doesn not depend on an input value which is given by the engine itself and in accordance with which a second value is determined with the aid of a control means. On the contrary, in the case of the method according to the invention both the fuel and the combustion air are coercively supplied in a predetermined amount and in a predetermined ratio, without taking into account the intake characteristics of the engine. The position of the throttle does not serve as a correcting variable, but is adapted to the amount of air which has to pass through.

An advantageous development of the method according to the invention is to be seen in the fact that the ratio of fuel amount to air amount remains constant during operation of the internal combustion engine. In particular in the case of acceleration or deceleration processes of the internal combustion engine, this constant ratio has an advantageous effect. The reaction time of the internal combustion engine in the case of desired changes in the engine speed or engine power is substantially reduced in comparison with engines operating in accordance with the methods according to the prior art, since the engine has immediately supplied thereto a sufficient amount of fuel and since it is not necessary to wait until the air intake characteristics of the engine change for being only then capable of reproportioning the amount of fuel to be injected. The method according to the invention supplies, also under no-load conditions, an optimum amount of fuel and combustion air to the engine so that damage to the engine or disturbance of the sequence of operations due to an excessively rich or an excessively lean mixture is rendered impossible. On the basis of the fact that the quantitative ratio is always constant, it is also possible to achieve an extremely low fuel consumption, since the internal combustion engine has not under any circumstances supplied thereto more fuel than the amount of fuel required for obtaining optimum combustion. Also in the case of maximum speeds of the internal combustion engine, the engine is operated under optimum conditions so that damage caused by an excessively lean mixture and the resultant excessive heating of the engine are avoided in an absolutely reliable manner.

An advantageous development of the method according to the invention also is to be seen in the fact that the ratio of fuel amount to air amount is adjusted to a richer value until a predetermined engine temperature is reached. An internal combustion engine operated in accordance with this method shows a particularly advantageous cold start performance and cold running properties which are just as advantageous. A special advantage in this connection is to be seen in the fact that an always constant ratio of fuel amount to air amount is supplied under all operating conditions, i.e. in the no-load condition as well as in the case of higher speeds, until the predetermined engine temperature has been reached. This has the effect that, in a very simple manner, optimum operation of the engine is guaranteed and that the risk of stalling of the engine or fouling of the sparking plugs due to sudden changes in the mixing ratio is excluded.

Another advantageous development of the method according to the invention is to be seen in the fact that the overall amount of fuel and air and the position of the throttle are directly proportional to each other. This entails the advantage that the engine always shows optimum intake characteristics, since the throttle always opens a flow cross-section having the appropriate size for permitting the predetermined amount of air to flow in. It follows that no pressure fluctuations which are caused by the engine and which may disturb the flow-in process will occur in the intake passage.

An advantageous development of the method according to the invention is also achieved by the fact that the ratio of fuel to air is a stoichiometric ratio. Hence, it is guaranteed that complete combustion of the fuel will take place under all operating conditions and that the chemical processes taking place during the combustion will show the highest possible efficiency.

A device for carrying out the method according to the invention is advantageously characterized by a pump device provided with two pump impellers, which are arranged such that they are coaxial and adapted to be rotated about an ideal axis of rotation and which are disposed in separate flow channels and provided with co-operating pole carrier members, said pump impellers constituting the contra-rotating parts of an electric motor which does not have any output shaft and which is exclusively used for the purpose of driving the pump impellers, the first pump impeller being part of a fuel pump whose outlet is connected to at least one injection nozzle, and the second pump impeller being designed as an air compressor impeller arranged in the area of the intake pipe. Such pumps are known, in principle, from U.S. Pat. No. 4,110,059. The pump according to the invention is based on the principle of providing an electric motor whose stator and rotor are arranged in a freely rotatable manner in a fixed support means. When current is applied, the rotor and the stator are caused to rotate in opposite directions relative to each other, without any torques being transmitted to the support means. The relative speed of the rotor and of the stator is determined by the structural design of the electric motor, in so far said electric motor follows the same structural principles as a conventional electric motor with a stationary stator and a rotatable rotor. Hence, if the electric motor consisting of a rotatable rotor and a rotatable stator is provided with an appropriate structural design, an always constant relative speed will exist between these two members. A deceleration of one of said two members will result in an increase in the speed of the other member. In the case of the pump according to the invention, the rotor and the stator are each part of a pump impeller, one pump impeller being part of a fuel pump and the other pump impeller being part of an air compressor. It follows that this pump device according to the invention represents a double pump for the fuel and for the combustion air. The work done by the fuel pump and the compressor pump, respectively, results from a multiplication of the pump speed and the pump torque. If one of these two pumps is throttled down, e.g. due to the fact that the outlet channel is closed, it will do less work and this will be evident from an increase in speed and from a decrease in torque. In view of the fact that the torque of each pump is equal and the torques of the two pumps are opposite to each other and in view of the fact that, moreover, the total speed of the two pump members relative to each other remains constant, the above-mentioned deceleration of one pump will have the effect that the other pump reduces its speed and applies also less torque and that, consequently, the work done by said pump will be reduced. This reduced amount of work done by the pump is directly proportional to the amount of work done by the other pump. It follows that the pump device according to the invention represents a device pumping two media which are independent of each other and the quantitative ratio of which is always the same. This quantitative ratio is independent of outer influences and is maintained under all operating conditions. Hence, the quantitative ratio of fuel to air only depends on the structural design of the pump device and is not influenced in any way by the operating parameters acting on the pump. It is, however, possible to cause a change in the volume ratio by exerting an appropriate mechanical or electrical influence on the entire pump device.

It follows that the pump device according to the invention, which has the fuel pump and the combustion air compressor integrated therein, represents a system including a control which is inherent in the system and which is not influenced by external parameters, in particular not by operating parameters of the internal combustion engine or by any disturbance variables. Hence, the entire device for supplying fuel and air to an internal combustion engine can dispense with electronic means and need not take into account any other influence variables. Furthermore, the device can dispense with all additional structural measures, which are required in the case of conventional devices e.g. for the purpose of maintaining an appropriate no-load behaviour of the internal combustion engine. Moreover, it is absolutely impossible that the engine is flooded, e.g. in the case of no-load operation or in the case of abrupt acceleration, due to an excessive amount of fuel supplied. Furthermore, the device in question completely excludes any failures caused by a change in the flow conditions of the combustion air, which failures may occur due to formation of ice in the case of inlet channels operating in accordance with the Venturi principle. An additional big advantage is to be seen in the fact that it is not necessary to synchronize the device, since the entire operating characteristics depend exclusively on the structural design of the pump device. It follows that the ratio between the combustion air to be supplied to the engine and the amount of fuel required is determined when the pump device is being constructed and does not change throughout the entire service life of the pump device. This has the effect that the maintenance costs are substantially reduced in view of the fact that readjustment will not be necessary under any circumstances. If the supply of fuel or combustion air to the device according to the invention is disturbed, e.g. by filters which are clogged or reduced in cross-section, this will only have the effect that the engine power is reduced. Since, e.g. in the case of a reduced amount of fuel, also a reduced amount of combustion air will be supplied in accordance with the predetermined ratio, damage to the engine is completely out of the question. The impaired engine power can also be detected by unskilled servicing staff and the causes of such impaired engine power can easily be eliminated. An additional substantial advantage of the device according to the invention results from the fact that the influences of air pressure, atmospheric density and air temperature, which are normally hard to compensate for by means of devices according to the prior art, do not exert any influence on the behaviour of the pump device according to the invention. If, for example, the density of the air changes, also the amount of fuel supplied will be reduced accordingly, in view of the always constant torque of the two pump impellers relative to each other.

Moreover, in comparison with devices according to the prior art, the device according to the invention, which is used for supplying fuel and air to an internal combustion engine, entails substantial advantages as far as costs are concerned. The production costs amount to approximately one third of the costs of the simplest carburettor and to one twelfth of the costs of an injection system. In view of the low susceptibility to failure and in view of the small number of structural components which are essential to the operation of the device, the number of as well as the costs for the spare parts required are reduced.

Furthermore, the device according to the invention is characterized by the advantage that is comprises, in addition to fuel injection, a combustion air compressor, which, in view of the behaviour described hereinbefore, is superior to all known blowers or compressors, since the amount of air supplied by said combustion air compressor never exceeds the amount of air actually required by the internal combustion engine.

An advantageous embodiment of the device according to the invention is to be seen in the fact that the compressor impeller is designed as stator and the fuel pump impeller is designed as rotor of the electric motor. This association of the two pump impellers permits the highest efficiency of the pump device with due regard to the different quantitative amounts of fuel and combustion air.

An advantageous embodiment of the device according to the invention also resides in the fact that the pump impellers are electrically connected to an actuator determining the position of the throttle and that the actuator is designed as a potentiometer which is coupled with an accelerator pedal. It is thus possible to achieve, on the basis of a very simple structural design and very low costs, a coupling by means of parallel connection between the throttle and the actuator determining the overall speed of the pump device. It follows that a change in the position of the accelerator pedal determines by means of the potentiometer the overall speed, i.e. the relative speed between the two pump impellers of the pump device, and moves, at the same time, the throttle valve to an appropriate position so that the amount of combustion air supplied is permitted to flow in. An increase or a decrease in the speed of the internal combustion engine can thus be achieved in a very simple and absolutely reliable manner.

An advantageous embodiment of the device according to the invention also resides in the fact that the internal combustion engine is equipped with an exhaust gas turbine, which is known per se and which is operatively connected to a generator and that the electric motor consisting of the rotor and the stator is connected to the generator and to a battery. On the basis of this structural design, the energy contained in the exhaust gas of the engine can be used in a very simple manner for the purpose of supplying the internal combustion engine with fuel and combustion air. Hence, provided that certain operating conditions exist and that the internal combustion engine is provided with an appropriate structural design, said generator can render superfluous a conventional dynamo.

A particularly advantageous embodiment of a device for carrying out the method according to the invention is characterized by a pump device provided with two pump impellers, which are arranged such that they are coaxial and adapted to be rotated about an ideal axis of rotation and which are disposed in separate flow channels and provided with co-operating drive-flow passages, said pump impellers constituting the contra-rotating parts of a hydraulic motor which does not have any output shaft and which is exclusively used for the purpose of driving the pump impellers, the first pump impeller being part of a fuel pump whose outlet is connected to at least one injection nozzle, and the second pump impeller being designed as an air compressor impeller arranged in the area of the intake pipe. In addition to the advantages described hereinbefore in connection with the pump device constituting an electric motor, such a device shows the advantage that the drive of said pump device is effected hydraulically. Such a hydraulic drive provides a very high degree of operational safety and reliability and can be realized in a very simple manner with the aid of commercially available structural components.

An advantageous embodiment of the device according to the invention resides in the features that the pump impellers are hydraulically connected to an actuator determining the position of the throttle and that the actuator is designed as a throttle valve coupled with an accelerator pedal. The use of a throttle valve for changing the speed of the pump device driven by the hydraulic motor is very simple, can be realized at a low price and provides absolute operational safety. The measure of coupling the actuator, which is formed by the throttle valve, with the throttle is analogous to the above-described measure of coupling the throttle with a potentiometer for controlling the speed of the electrically driven pump device.

A particularly advantageous embodiment of the device according to the invention resides in the fact that the internal combustion engine is equipped with an exhaust gas turbine, which is known per se and which is operatively connected to a hydraulic fluid pump and that the hydraulic fluid pump is adapted to be operatively connected to the hydraulic motor. It is thus possible to drive the hydraulic motor by utilizing the energy contained in the exhaust gas, so that, during operation of the internal combustion engine, the use of an additional hydraulic fluid pump may become superfluous.

A particularly advantageous embodiment of the devices according to the invention also resides in the fact that the compressor impeller is adapted to be operatively connected to an electromagnetic brake, which is adapted to be excited in response to the cylinder head temperature of the internal combustion engine. When the internal combustion engine is being started, i.e. under cold start or cold running conditions, the electromagnetic brake is excited and decelerates the compressor impeller accordingly to a certain degree so that the quantitative ratio of fuel to combustion air, which depends on the type of structural design employed, is changed such that, during this cold running phase, an always constant ratio of fuel to combustion air exists, in the case of which the amount of fuel provided is higher than the amount of fuel provided in the case of the non-decelerated mode of operation of the pump device. The use of a magnetic brake represents a low-priced possibility of increasing the proportion of fuel during the cold running phase of the internal combustion engine, said possibility providing absolute operational safety and being not subject to wear.

DESCRIPTION OF THE DRAWINGS

In the following, the method according to the invention will be described on the basis of embodiments in connection with the drawing, in which.

DESCRIPTION OF A PREFERRED EMBODIMENT

Figure 1:
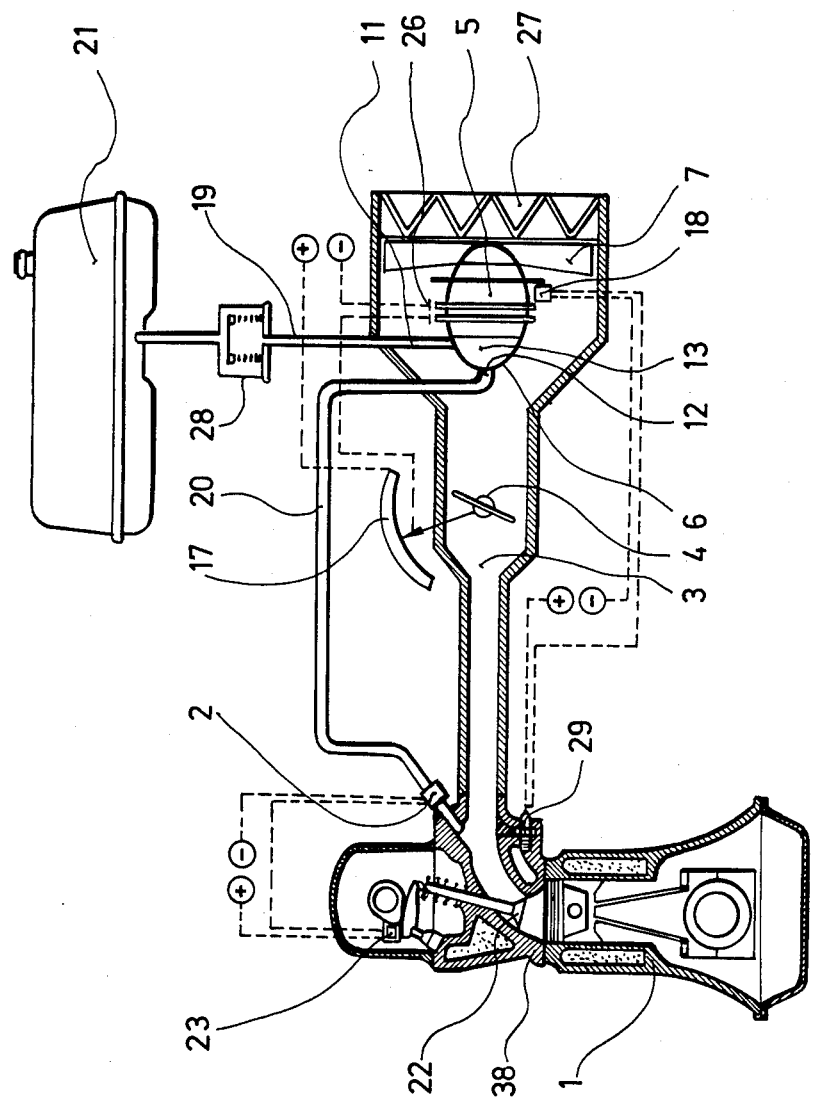
FIG. 1 shows a schematic representation of an internal combustion engine comprising a pump device according to the invention, which is designed as an electric motor.

FIG. 1 shows, in a schematic representation, an internal combustion engine 1 comprising, as is normally the case, a crank-shaft, which is not shown in detail, and at least one cylinder within which a piston can be moved by means of a connecting rod. The internal combustion engine 1 comprises, as is normally the case, a cylinder head 38 which has provided therein—for each cylinder—at least one inlet valve 22 as well as at least one outlet valve, which is not shown in FIG. 1, as well as at least one sparking plug, which is not shown either. The cylinder head 38 of the internal combustion engine 1 is connected to an intake pipe 3, which has rotatably supported therein a throttle 4. In accordance with structural requirements, the intake pipe 3 is provided with a suitable cross-section. In the area of the inlet valve 22, the intake pipe 3 has provided therein an injection valve 2, which is connected to a fuel line 20 and which is adapted to be electrically actuated. The injection valve 2 and the fuel line 20 jointly define a part of a fuel supply system, which additionally comprises a fuel tank 21, a fuel filter 28, which is operatively connected to said fuel tank 21, as well as a fuel supply line 19, which is provided subsequently to said fuel filter. The fuel supply line 19 is connected to the inlet 11 of a fuel pump 13, the fuel line 20 is connected to an outlet 12 of the fuel pump. The fuel pump 13 is provided with a pump impeller 6, which is part of a pump device 5. Hence, the fuel supply system pumps fuel from the fuel tank 21 to the injection valve 2. The injection valve 2 is electrically connected to a switch 23 opening the injection valve 2, which is normally designed as a magnetic valve, in response to the opening of the inlet valve 22. The amount of fuel injected is proportional to the amount of fuel supplied by the pump impeller 6, and, as has been described hereinbefore, this amount is, in turn, operatively dependent on the amount of combustion air supplied. In the case of the embodiment shown, the pressure difference between the fuel line 20 and the intake pipe 3 lies within a range of from 8 to 40 PSI (551 to 2,757 hPa (hecto-Pascal)).

The pump device 5, which comprises the fuel pump impeller 6 as well as the air compressor impeller 7, is arranged in a suitably enlarged cross-sectional area of the intake pipe 3. Prior to the compressor impeller 7, an air filter 27 is provided. The compressor impeller 7, which acts as the stator of the electric air into the intake pipe 3. Just as a potentiometer 17, the throttle 4 is connected to an accelerator pedal which is not shown. A change in the position of the accelerator pedal has the effect that the throttle 4 is rotated and that the potentiometer 17 is adjusted. The position of the potentiometer 17 determines the speed of the pump device 5, i.e. the relative speed of the two pump impelelrs 6 and 7. When the internal combustion engine is in operation, the throttle 4 is coupled with the speed of the pump device 5 in such a way that it always opens within the intake pipe 3 an appropriate flow cross-section. The cylinder head 38 has provided thereon a thermostat 29, which is electrically connected to a magnetic brake 18 acting on the compressor impeller 7. If the cylinder head 38 has a temperature below the response temperature of the thermostat 29, the magnetic brake 18 will be acted upon by current and will, consequently, decelerate the compressor impeller 7. This will have the effect that the speed of the fuel pump impeller 6 is increased, which will result in a richer fuel/combustion air ratio. In this way, the internal combustion engine has supplied thereto an appropriate mixing ratio of fuel and combustion air during the cold running phase. As soon as the temperature of the cylinder head 38 has increased, the thermostat interrupts the supply of current to the magnetic brake 18, so that the pump device 5 will supply the fuel/air ratio which depends on the type of structural design used.

Figure 2:
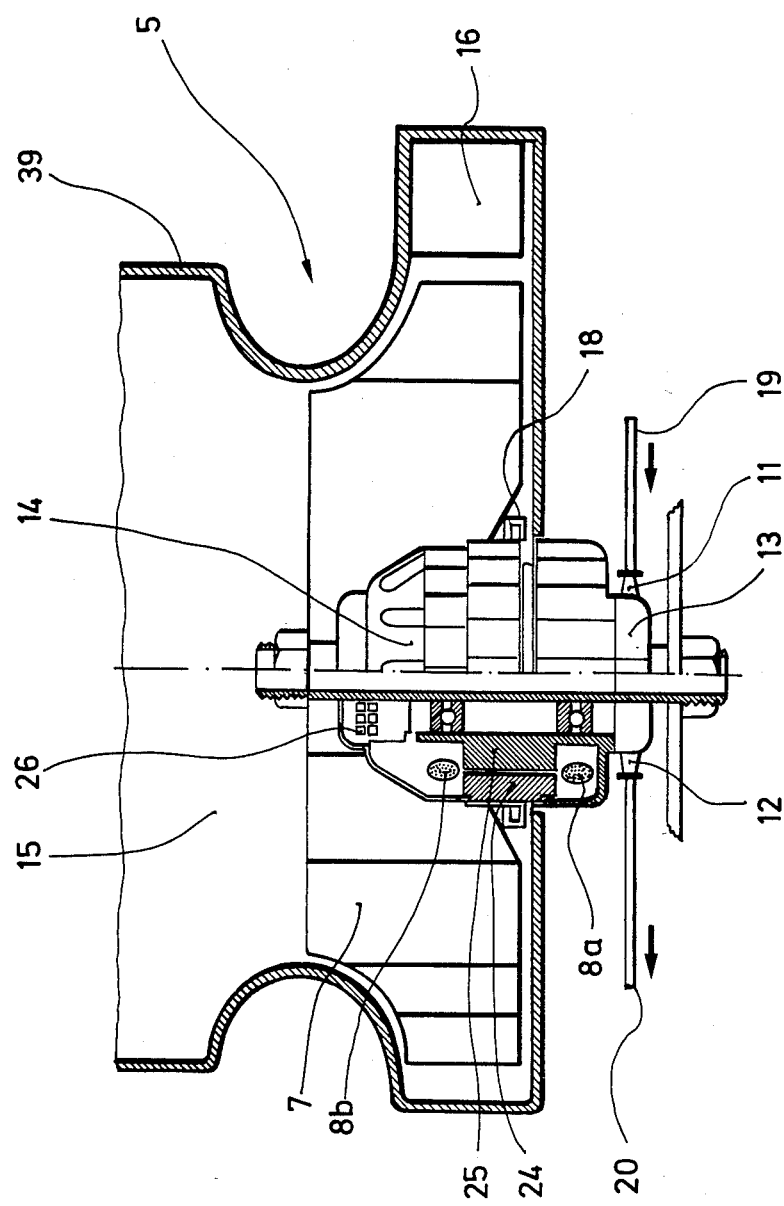
FIG. 2 shows an enlarged schematic representation of the pump device according to the invention, which is designed as an electric motor.

FIG. 2 shows an additional embodiment of the pump device 5 according to the invention. The pump device 5 consists of the fuel pump 13 and of the compressor 14. The pump impeller of the fuel pump 14, whose inlet 11 is connected to the fuel supply line 19 and whose outlet 12 is connected to the fuel line 20, is connected to the rotor 25 of the electric motor defining the pump device 5. The stator 24 is connected to the compressor impeller 7. The pump device additionally comprises pole carrier members 8a and 8b, which are used for the purpose of driving the rotor and the stator. The transmission of electric energy is effected by means of slip rings 26. The magnetic brake 18 acts on the stator 24—in the manner which has already been described hereinbefore—and, consequently, on the compressor impeller 7. The compressor impeller 7 is surrounded by a housing 39, which is provided with an air inlet 15 and with an air outlet 16. The air outlet 16 is connected to the intake pipe 3 in a manner which is not shown.

Figure 3:
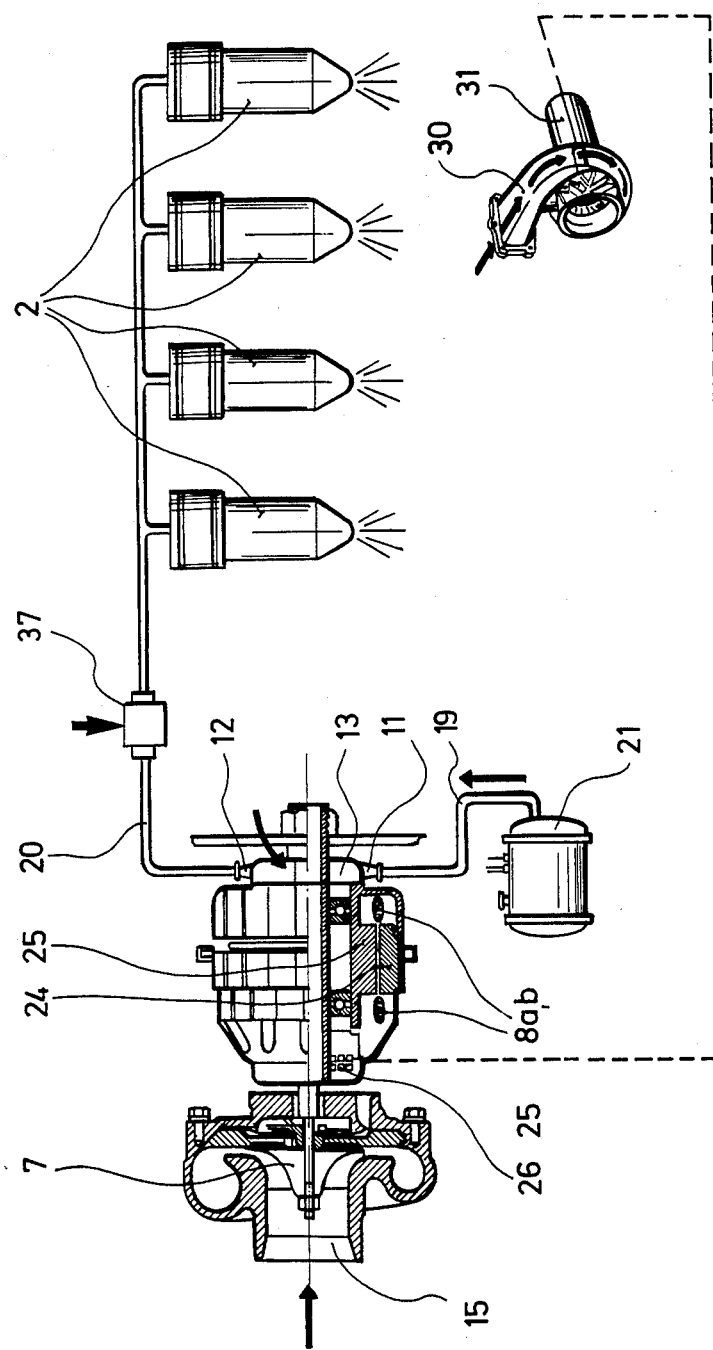
FIG. 3 shows a schematic representation of an internal combustion engine provided with an exhaust gas turbine and equipped with the pump device according to the invention, which defines an electric motor.

FIG. 3 shows an additional embodiment of the method according to the invention, said method being used for supplying fuel and combustion air to an internal combustion engine. In the case of this example, the internal combustion engine is a heavy Diesel engine, which is not shown in detail and which provided with four schematically represented injection valves 2 connected to the fuel line 20. A speed governor 37 is provided between the fuel line 20 and the injection valves 2. Fuel is supplied to a fuel pump 13 from a fuel tank 21 through a fuel supply line 19, said fuel pump 13 being part of the pump device which has already been described hereinbefore and having connected to its outlet 12 the fuel line 20. The stator 24 of the pump device is connected to the compressor impeller 7 of a compressor means designed as a radial turbine. An exhaust gas turbine 30 is connected to the Diesel engine exhaust gas passage, which is not shown; said exhaust gas turbine 30 drives, by means of the exhaust gases, a generator 31 which is electrically connected to the slip rings 26 of the pump device. Hence, said generator 31 can be used for full power supply of the pump device as well as for charging a battery, which is not shown. In contrast to engines according to the prior art, a Diesel engine designed in the manner described hereinbefore and equipped with an exhaust gas turbine will require practically no reaction time when changing from no-load operation to a sudden acceleration and will immediately have supplied thereto a sufficient amount of combustion air and fuel, which will be in an optimum ratio to each other. The negative effect known in the case of Diesel engines according to the prior art, viz. that large amounts of non-burnt fuel are discharged from the exhaust in the form of carbon black when the accelerator pedal is actuated, cannot occur in the case of such an engine. If an additional electric battery is used, the mode of operation of the fuel/air supply will not even be influenced by the fact that the exhaust gas turbine 30 operates only with low efficiency in the case of no-load speeds or in the case of low speeds.

Figure 4:
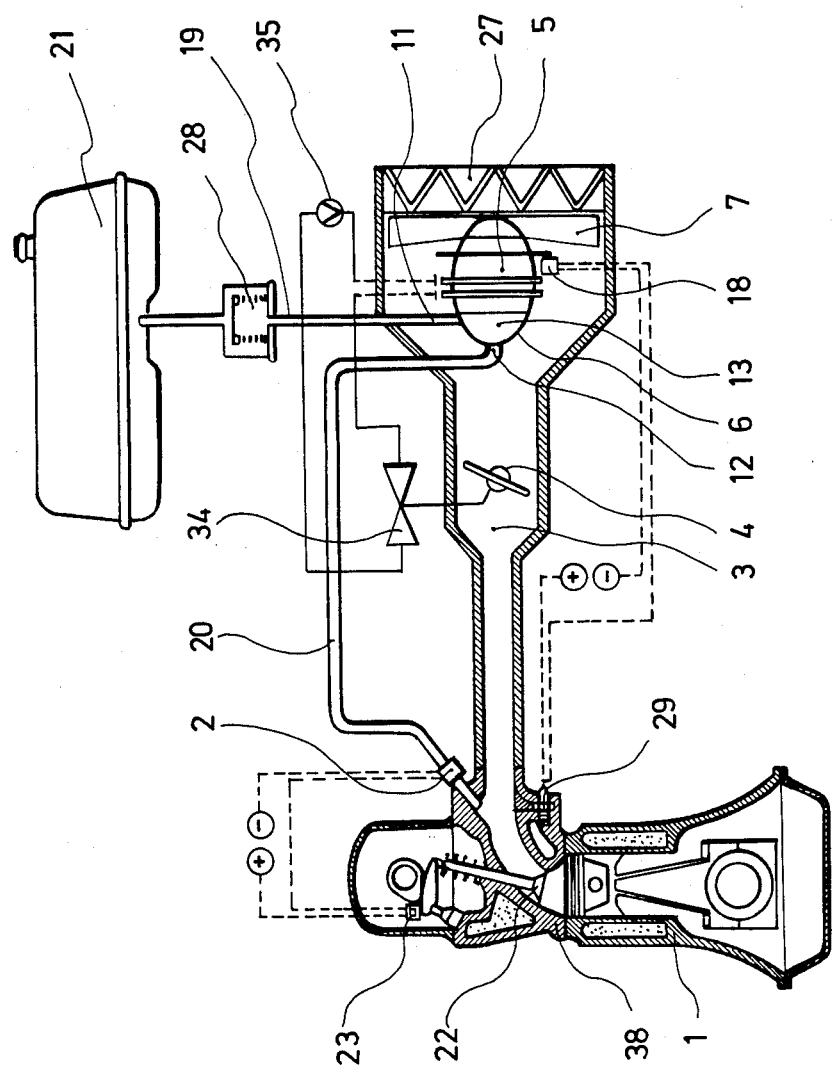
FIG. 4 shows a schematic representation of an internal combustion engine provided with a hydraulic pump device according to the invention.
Figure 5:
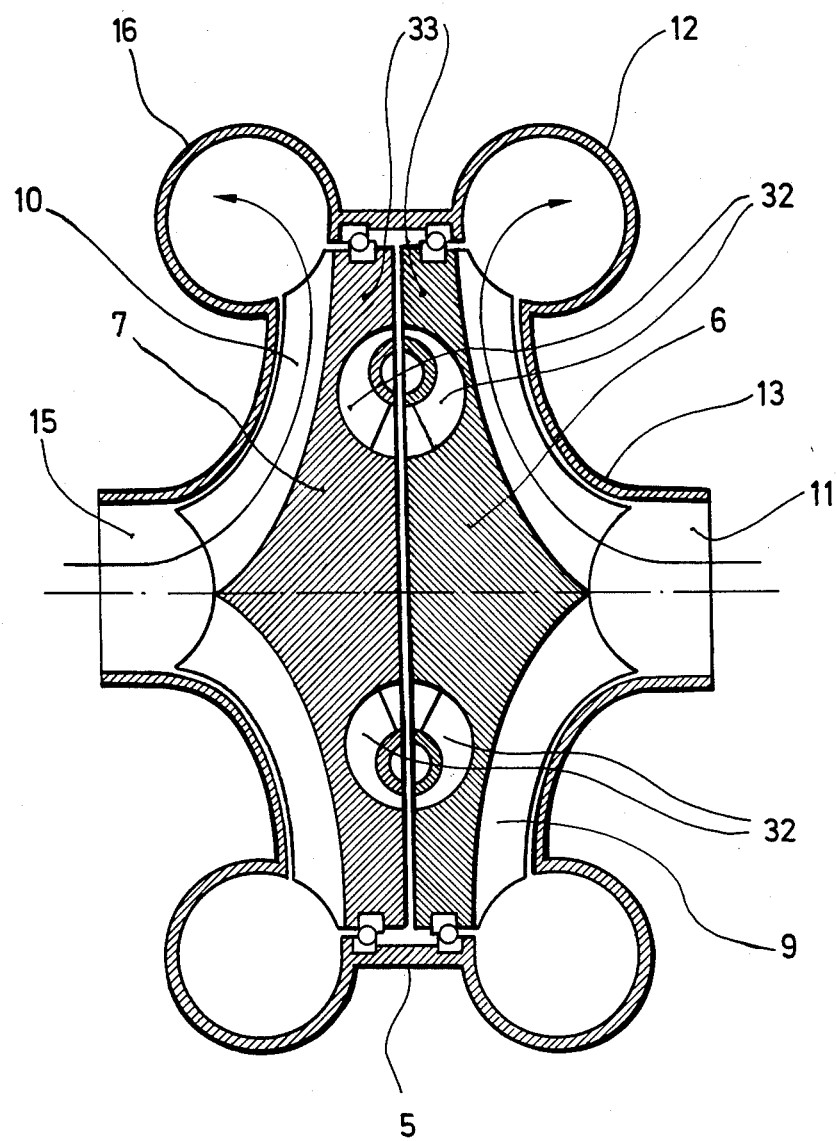
FIG. 5 shows an enlarged schematic representation of a pump device according to the invention, which defines a hydraulic motor.

FIG. 4 shows, in analogy with FIG. 1, a schematic representation of an internal combustion engine which differs from the internal combustion engine according to FIG. 1 in so far as the pump device 5, which is composed of the fuel pump 13 and of a compressor with the compressor impeller 7, does not act as an electric motor, but as a hydraulic motor. As will be shown in detail in FIG. 5 hereinbelow, the pump impellers 6 and 7 are provided with appropriate drive-flow passages for this purpose. Instead of the potentiometer 17, a throttle valve 34 is provided in the case of this embodiment, said throttle valve 34 and the throttle 4 being jointly actuated by an accelerator pedal, which is not shown. The intake pipe cross-section opened by the throttle 4 corresponds, in this case, to a corresponding degree of opening of the throttle valve 34 so that the hydraulic fluid, which has been pressurized by means of a hydraulic fluid pump 36, can be supplied to the pump device 5. The two pump impellers 6 and 7, which are used for pumping the fuel and for compressing the combustion air, jointly define a hydraulic motor 33 in the case of the embodiments shown in FIG. 4 to 6. For this purpose, the opposed surfaces of the two pump impellers 6 and 7 include appropriate drive-flow passages 32 through which the fluid medium is passed so that the function of this pump device corresponds to that of the electric pump device described hereinbefore. In the case of this embodiment, the pump device is designed as a radial pump, such radial pumps being known from the prior art.

Figure 6:
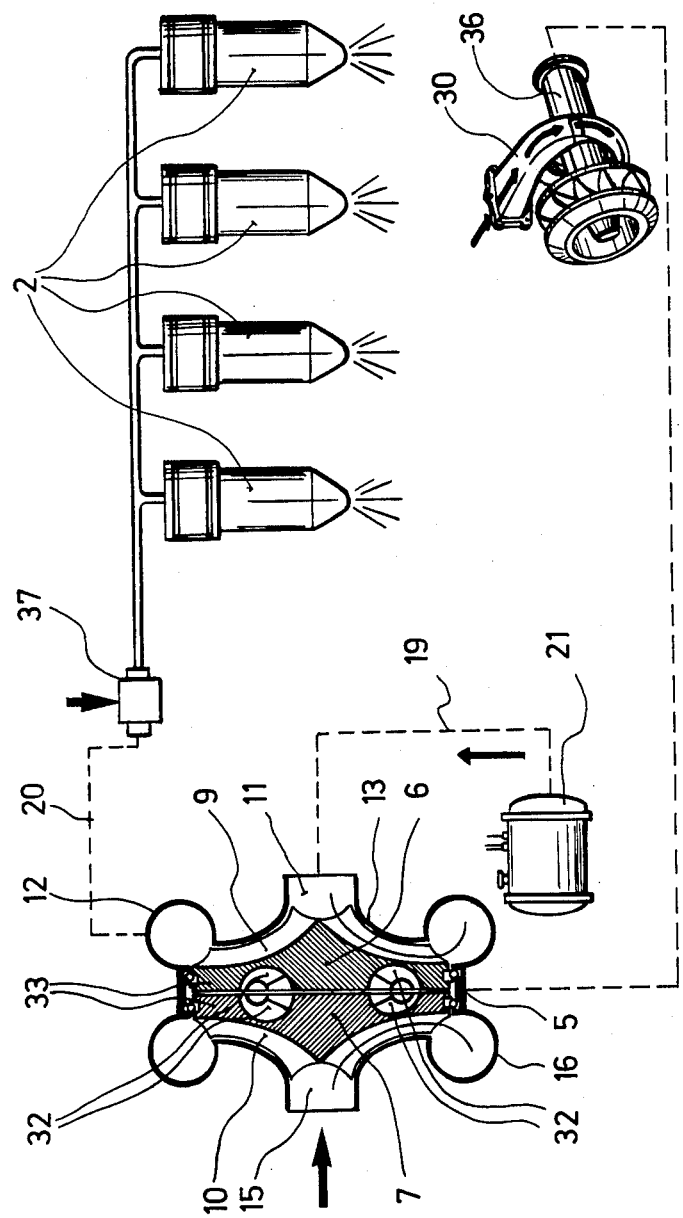
FIG. 6 shows a schematic representation of an internal combustion engine provided with an exhaust gas turbine and equipped with a pump device according to the invention, which defines a hydraulic motor.
Figure 7:
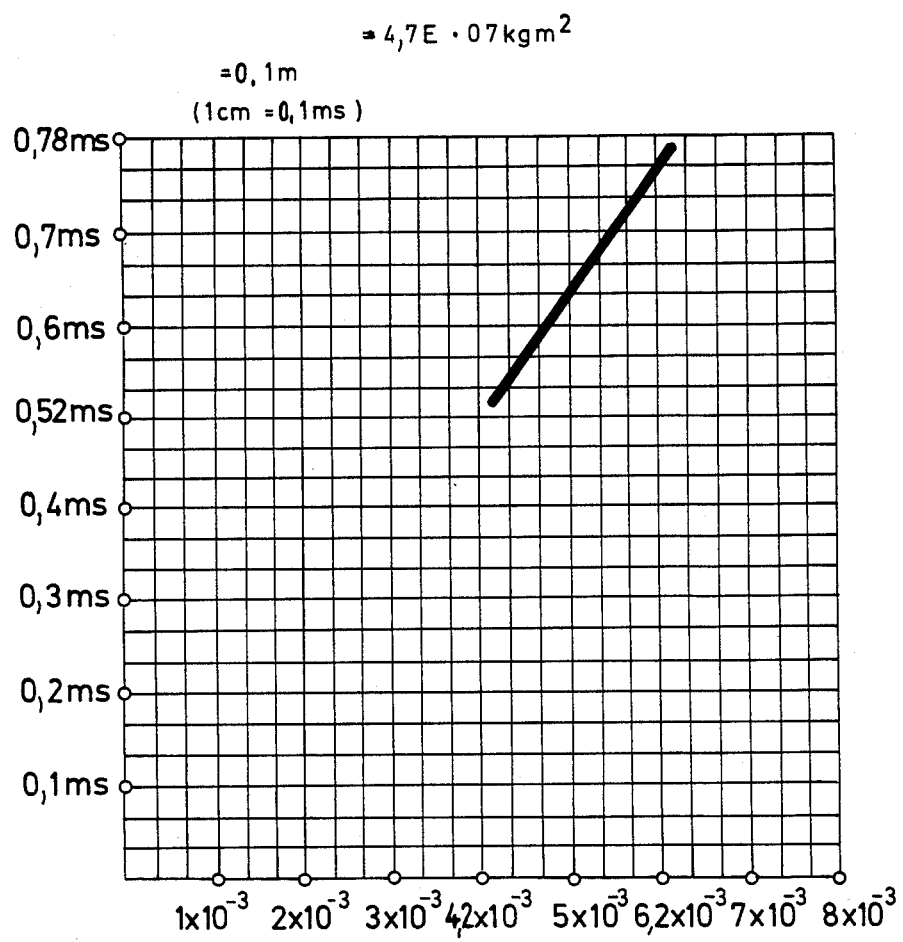
FIG. 7 shows a diagram revealing the reaction time in response to the rotational speed of the pump device.

FIG. 6 shows in accordance with an additional embodiment, which is analogous to the embodiment shown in FIG. 3, a device according to the invention which is used for supplying fuel and combustion air to a Diesel engine. This embodiment differs from the embodiment shown in FIG. 3 with regard to the fact that the hydraulic motor 33, which has been described in FIG. 5 and which is defined by the two pump impellers 6 and 7, is used in the case of this embodiment. The exhaust gas turbine 30, which is connected to the internal combustion engine in a manner which has not been shown, drives, in the case of this embodiment, a hydraulic fluid fluid pump 36 supplying hydraulic fluid to the hydraulic motor 33. This supply of hydraulic fluid may either be effected by the hydraulic fluid pump 36 alone, or by an additional, separate hydraulic fluid pump, which is not shown, or, additionally, by a hydraulic fluid reservoir, which is not shown. FIG. 7 shows a graphic representation of the reaction time of the electric pump device according to the embodiments of FIGS. 1 to 3. In order to elucidate the advantageous mode of operation and the extremely short reaction time of the pump device according to the invention, the reaction time for a special embodiment will be calculated hereinbelow. In the case of said embodiment, the stator of the electric motor carries an AE 195-2 EBM type compressor impeller. The power and the reaction time of the electric motor satisfy the following equation:

$$P \cdot Rt = \tfrac{1}{2} \cdot I \cdot W^2 \tag{1}$$

In this equation,

P = the power of the motor, which is 67 Watts = 6.7 kp m sec$^-$,
RPM of the motor 2,530 min$^{-1}$
RPM of the stator 1,500 min$^{-1}$ (angular velocity = 157 sec$^{-1}$).
Moment of inertia of the compressor impeller and stator:

$$I = 4.7 \cdot 10^{-7} \text{ kg m}^2$$

Rt = reaction time required for obtaining the full rotational speed.

When the above-mentioned numerical values are inserted into equation (1), the following value will be obtained for Rt:

$$Rt = 8.6 \cdot 10^{-4} \text{ sec.}$$

In the following, the change in the kinetic energy of the air stream is balanced against the change in the rotational energy of the compressor impeller and the stator. This relationship satisfies the following equation:

$$178\ 19\ M \cdot V_{12} - \tfrac{1}{2} \cdot M \cdot V_{22}) \cdot Rt = \tfrac{1}{2} \cdot I \cdot W_{12} - \tfrac{1}{2} \cdot I \cdot W_{22} \tag{2}$$

In this equation,

M = mass of air per second
V$_1$ = initial air intake velocity
V$_2$ = final air intake velocity
Rt = reaction time
I = moment of inertia of compressor impeller and stator
W$_1$ = initial angular velocity per second
W$_2$ = final angular velocity per second.

If the circumferential speed ratio of the compressor impeller is equated with 1, the following equation will be obtained:

$$V = r \cdot W \tag{3}$$

wherein r = tip radius of the compressor impeller in (r = 0.1 m). Furthermore, the following relationship exists:

$$M = \frac{Y \cdot A \cdot V}{g} \tag{4}$$

M = mass of air
Y = air density = 1.2 kg m$^{-3}$
A = $\pi \cdot r^2$
g = 9.8 m sec$^{-2}$ (gravity constant).

When these values and equations are inserted in equation (2), the following equation will be obtained:

$$Rt \left( \tfrac{1}{2} \frac{Y \cdot A \cdot r \cdot W_1}{g} (r \cdot W_1)^2 - \tfrac{1}{2} \frac{Y \cdot A \cdot r \cdot W_2}{g} (r \cdot W_2)^2 \right) = \tfrac{1}{2} \cdot I \cdot W_1^2 - \tfrac{1}{2} \cdot W_2^2.$$

Solving for Rt results in the following equation:

$$Rt = \frac{2.6 \cdot I}{r^5} \cdot \frac{(W_1^2 - W_2^2)}{W_1^3 - W_2^3}$$

When the above-indicated AE 195-2 EBM type compressor impeller, with r = 0.1 m and 1 = 4.7·10$^{-7}$ kg m$^2$ is used, the reaction time is shown in FIG. 7. Taking into account the above-indicated equations and the results shown in FIG. 7, a very short reaction time of the pump device according to the invention is obtained, said reaction time having an order of magnitude of ten thousandths parts of a second. The method of increasing the proportion of fuel during the cold running phase or rather during the period required for reaching a predetermined engine temperature—which method is described in the embodiments in connection with the device disclosed in the present invention and used for supplying fuel and air to an internal combustion engine—is not limited to the use of the-above-described magnetic brake for reducing the speed of the compressor impeller. On the contrary, it is also possible to produce the same effect by an appropriate mechanical or hydraulical brake device. The devices for carrying out the method according to the invention, which are shown in the embodiments in connection with FIG. 1 to 6, still leave a wide range of possibilities for structural modifications within the scope of the inventive concept. It is, for example, possible to optimize, by means of an appropriate optimization of the intake pipe, the flow conditions in said intake pipe and in the area of the compressor impeller and of the throttle to an even higher degree. One possibility is, for example, that, by means of an appropriate structural design of the throttle or by means of limiting the minimum flow cross-section between the throttle and the intake pipe existing in the case of no-load operation, a leaner mixture is supplied to the engine, since in this position the pump device will practically do no work and will, consequently, supply to the engine an only very small amount of fuel and combustion air, whereas—due to its intake characteristics—said engine will take in additional combustion air through the intake pipe and through the compressor impeller which rotates only at a low speed. In a similar manner, it is possible to further improve the full-speed behaviour by means of a suitable structural design. In the case of full-speed operation, the throttle is completely open and the pump device -in the case of a pump device defining an electric motor—has supplied thereto a maximum amount of current, which will result in maximum-efficiency operation of said pump device.

Under these conditions, the efficiency of the compressor impeller can be increased to such an extent that the flow resistances in the intake pipe can be fully neglected. It is thus possible to effect an even better supply of fuel and combustion air to the internal combustion engine. If, in the case of such full-speed operation of an automotive vehicle equipped with a device according to the invention, the accelerator pedal is suddenly fully released, the throttle will almost completely close the intake pipe, and this will have the effect that neither fuel nor combustion air is supplied to the engine, whereby the application of thrust to the engine will be discontinued in the simplest possible manner and without the aid of any control or regulating components. Furthermore, it is also possible to develop the above-shown embodiments of the device according to the invention in such a way that the various operating conditions of the pump device effect a corresponding sparking advance or retard for achieving thus even better combustion characteristics.

I claim:

1. A device for supplying fuel and air to an internal combustion engine (1) comprising a fuel pump (13), the outlet (12) of which is connected to at least one injection nozzle (2) through a fuel line (20) and an air intake pipe (3) having disposed therein a throttle (4) and being provided with said injection valve (2) being characterized in a pump device (5) provided with two pump impellers (6, 7) which are arranged such that they are co-axial and adapted to be rotated about an ideal axis of rotation and which are disposed in separate flow channels (9, 10) and provided with co-operating pole carrier members (8a, 8b), said pump impellers constituting the contra-rotating parts of an electric motor, which does not have any output shaft and which exclusively drives said pump impellers (6, 7), the first pump impeller (6) being part of said fuel pump (13) and the second pump impeller (7) being designed as an air compressor impeller arranged in the area of the intake pipe (3).

2. A device for supplying fuel and air to an internal combustion engine (1) comprising a fuel pump (13), the outlet (12) of which is connected to at least one injection nozzle (2) through a fuel line (20) and an air intake pipe (3) having disposed therein a throttle (4) and being provided with said injection nozzle (2) characterized in a pump device (5) provided with two pump impellers (6, 7) which are arranged such that they are co-axial and adapted to be rotated about an ideal axis of rotation and which are disposed in separate flow channels (9, 10) and provided with co-operating drive-flow passages (32), said pump impellers constituting the contra-rotating parts of a hydraulic motor (33), which does not have any output shaft and which exclusively drives the pump impellers, the first impeller (6) being part of said fuel pump (13) and the second pump impeller (17) being designed as an air compressor impeller arranged in the area of the intake pipe (3).

3. A device for supplying fuel and air to an internal combustion engine (1) comprising a fuel pump (13), the outlet (12) of which is connected to at least one injection nozzle (2) through a fuel line (20) and an air intake pipe (3) having disposed therein a throttle (4) and being provided with said injection valve (2) being characterized in a pump device (5) provided with two pump impellers (6, 7) which are arranged such that they are co-axial and adapted to be rotated about an ideal axis of rotation and which are disposed in separate flow channels (9, 10), said pump impellers constituting the contra-rotating parts of a motor, which does not have any output shaft and which exclusively drives said pump impellers (6, 7), the first pump impeller (6) being part of said fuel pump (13) and the second pump impeller (7) being designed as an air compressor impeller arranged in the area of the intake pipe (3).

4. Pump means (5) for supplying to an air intake pipe (3) of an internal combustion engine (1) having a throttle (4) therein a predetermined amount of air corresponding to a respective position of said throttle (4) and for simultaneously supplying to at least one fuel injection valve (2) of said engine (1) an amount of fuel in a fixed predetermined ratio to said predetermined amount of air, said pump means (5) comprising:
a first impeller (6) for supplying fuel to said fuel injection valve (2);
a second impeller (7) for supplying air to said air intake pipe (3);
said impellers being co-axially arranged and contra-rotatable relative to each other on an axis of rotation;
and drive means to effect relative contra-rotation of said impellers at a constant relative rotational speed with respect to each other.

5. A system comprising:
an internal combustion engine (1),
at least one fuel injection valve (2) for supplying fuel to said engine (1);
at least one air intake pipe (3) for supplying air to said engine (1);
a throttle (4) for controlling air flow through said intake pipe (3);
pump means (5) for supplying to said air intake pipe (3) a predetermined amount of air corresponding to the position of said throttle (4) and for simultaneously supplying to said fuel injection valve (2) an amount of fuel in a fixed predetermined ratio to said predetermined amount of air, said pump means (5) comprising;
a first impeller (6) for supplying fuel to said fuel injection valve (2);
a second impeller (7) for supplying air to said air intake pipe (3), said impellers (6, 7) being co-axially arranged and contra-rotatable relative to each other on an axis of rotation;
and drive means to effect relative contra-rotation of said impellers at a constant relative rotational speed with respect to each other, said drive means comprising a motor in which said impellers (6, 7) comprise relatively contra-rotating components of said motor;
and control means for said motor for changing said constant relative rotational speed of said impellers (6, 7) to change the power output of said engine (1) in accordance with the position of said throttle (4).

6. A pump device (5) for supplying fuel and air to an internal combustion engine (1), in which fuel is supplied to at least one injection valve (2) and combustion air is supplied to at least one intake pipe (3) provided with a throttle (4), and the said intake pipe (3) has coercively supplied thereto a predetermined amount of air corresponding to the respective position of the said throttle (4) and that, simultaneously, the injection valve (2) has coercively supplied thereto an amount of fuel in a fixed, predetermined ratio to the amount of air, said pump device (5) provided with two pump impellers (6, 7), which are arranged such that they are coaxial and adapted to be rotated about an ideal axis of rotation and which are disposed in separate flow channels (9, 10) and provided with co-operating pole carrier members (8a, 8b), said pump impellers constituting the contra-rotating parts of an electric motor, which does not have any output shaft and which is exclusively used for the purpose of driving said pump impellers (6, 7), the first pump impeller (6) being part of a fuel pump (13) whose outlet (12) is connected to at least one injection nozzle (2), and the second pump impeller (7) being designed as an air compressor impeller arranged in the area of the intake pipe (3).

7. A device according to claim 1, characterized in that the compressor impeller (7) is designed as stator (24) and that the fuel pump impeller (6) is designed as rotor (25) of the electric motor.

8. A device according to claim 1, characterized in that the pump impellers (6, 7) are electrically connected to an actuator determining the position of the throttle (4).

9. A device according to claim 1, characterized in that the actuator is designed as a potentiometer (17), which is coupled with an accelerator pedal.

10. A device according to claim 1, characterized in that the internal combustion engine (1) is equipped with an exhaust gas turbine (30), which is known per se and which is operatively connected to a generator (31), and that the electric motor consisting of the rotor (25) and the stator (24) is connected to the generator (31) and to a battery.

11. A device according to claim 2, characterized in that the pump impellers (6, 7) are hydraulically connected to an actuator determining the position of the throttle (4).

12. A device according to claim 2, characterized in that the actuator is designed as a throttle valve (34) coupled with an accelerator pedal.

13. A device according to claim 2, characterized in that the internal combustion engine (1) is equipped with an exhaust gas turbine (30), which is known per se and which is operatively connected to a hydraulic fluid pump (36) and that the hydraulic fluid pump (36) is adapted to be operatively connected to the hydraulic motor (33).

14. A device according to claim 1 or 2, characterized in that the compressor impeller (7) is adapted to be operatively connected to an electromagnetic brake (18), which is adapted to be excited in response to the cylinder head temperature of the internal combustion engine (1).

15. A device according to claim 1 or 2, characterized in that the injection valve (2), which is inserted in the fuel line (20), is designed as an injection nozzle which is adapted to be electrically actuated by means of a switch (23) in response to the opening position of an inlet valve (22).

16. Pump means (5) according to claim 4 wherein said drive means is responsive to the position of said throttle (4) to control the rotational speed of said impellers.

17. Pump means (5) according to claim 4 or 16 wherein said drive means comprises a motor and wherein said first impeller (6) and said second impeller (7) comprise relatively contra-rotating components of said motor.

18. Pump means (5) according to claim 17 wherein said motor is an electric motor and said first impeller (6) and said second impeller (7) comprise, respectively, a rotor (25) and a stator (24) of said electric motor.

19. Pump means (5) according to claim 17 wherein said motor is a hydraulic motor.

20. A system according to claim 5 wherein said control means comprises:
   a selectively positionable control member for selectively positioning said throttle (4);
   and actuator means (17, or 34) responsive to throttle position and operatively connected to said motor.

21. A system according to claim 20 wherein said motor is an electric motor and said actuator means comprises a rheostat responsive to the position of said control member and electrically connected to said electric motor.

22. A system according to claim 21 further including an electric generator (31) driven by said engine (1) for supplying electric power to energize said electric motor.

23. A system according to claim 22 further including an exhaust gas turbine (30) driven by said engine (1) and wherein said turbine (30) drives said electric generator (31).

24. A system according to claim 23 wherein said motor is a hydraulic motor (33) and said actuator means comprises an adjustable valve responsive to the position of said control member and hydraulically connected to said hydraulic motor (33).

25. A system according to claim 24 further including a hydraulic fluid pump (36) driven by said engine (1) for supplying hydraulic power to energize said hydraulic motor (33).

26. A system accordint to claim 25 further including an exhaust gas turbine (30) driven by said engine (1) and wherein said turbine (30) drives said hydraulic fluid pump (36).

27. A system according to claim 5 or 20 or 21 or 22 or 23 or 24 or 25 or 26 further comprising:
   an electro-magnetic brake (18) operatively connected to said second impeller (7),
   and sensor means (29) responsive to the cylinder head temperature of said engine (1) to effect operation of said brake (18).

28. A system according to claim 5 or 20 or 21 or 22 or 23 or 24 or 25 or 26 wherein said engine (1) comprises at least one inlet valve (22) having open and closed positions and further comprising switch means (23) responsive to the positions of said inlet valve (22) to effect operation of said fuel injection valve (2).

* * * * *